(12) United States Patent
Iwamoto (10) Patent No.: US 12,214,768 B2
(45) Date of Patent: Feb. 4, 2025

(54) DRIVING FORCE CONTROL METHOD AND DRIVING FORCE CONTROL DEVICE

(71) Applicant: Nissan Motor Co., Ltd., Yokohama (JP)

(72) Inventor: Tadashi Iwamoto, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 18/688,964

(22) PCT Filed: Sep. 6, 2021

(86) PCT No.: PCT/JP2021/032722
§ 371 (c)(1),
(2) Date: Mar. 4, 2024

(87) PCT Pub. No.: WO2023/032220
PCT Pub. Date: Mar. 9, 2023

(65) Prior Publication Data
US 2024/0326771 A1    Oct. 3, 2024

(51) Int. Cl.
*B60W 10/08*   (2006.01)
*B60L 15/20*   (2006.01)
*B60W 20/15*   (2016.01)

(52) U.S. Cl.
CPC ............ *B60W 10/08* (2013.01); *B60L 15/20* (2013.01); *B60W 20/15* (2016.01); *B60W 2520/10* (2013.01); *B60W 2720/403* (2013.01)

(58) Field of Classification Search
CPC .... B60W 20/15; B60W 20/17; B60W 30/182; B60W 50/0098; B60W 50/082;
(Continued)

(56) References Cited

U.S. PATENT DOCUMENTS

| | | | |
|---|---|---|---|
| 5,148,883 A * | 9/1992 | Tanaka | B60L 50/60 180/197 |
| 2006/0076740 A1* | 4/2006 | Sugiyama | B60L 7/00 280/5.502 |

(Continued)

FOREIGN PATENT DOCUMENTS

| | | |
|---|---|---|
| EP | 2612782 A1 | 7/2013 |
| EP | 2778006 A1 | 9/2014 |

(Continued)

*Primary Examiner* — David A Testardi
(74) *Attorney, Agent, or Firm* — Young Basile Hanlon & MacFarlane, P.C.

(57) ABSTRACT

A step corresponding control of adjusting driving force of the front wheel motor and driving force of the rear wheel motor when the vehicle passes through a step is executed. In the step corresponding control, after a front wheel ride-up timing at which the front wheel rides up the step and before a rear wheel ride-up timing at which the rear wheel rides up the step, a first control mode in which the front wheel motor is regenerated and the rear wheel motor is powered is executed. In the step corresponding control, after the execution of the first control mode and before the rear wheel ride-up timing, a second control mode in which the front wheel motor is powered and the rear wheel motor is regenerated is executed.

6 Claims, 6 Drawing Sheets

(58) Field of Classification Search
CPC ....... B60W 2554/60; B60K 1/02; B60K 6/52; B60L 15/20; B60L 15/22; B60L 2260/26; B60L 2260/28; B60L 2270/145; B60G 17/0164; B60G 2800/164
See application file for complete search history.

(56) References Cited

U.S. PATENT DOCUMENTS

| | | | |
|---|---|---|---|
| 2013/0151104 A1 | 6/2013 | Fujii et al. | |
| 2014/0163837 A1* | 6/2014 | Um | B60W 30/143 701/93 |
| 2014/0309902 A1* | 10/2014 | Katsuyama | B60W 10/22 701/70 |
| 2015/0100205 A1* | 4/2015 | Katsuyama | B60L 3/10 701/37 |
| 2016/0114644 A1* | 4/2016 | Morita | B60G 17/0195 701/37 |
| 2016/0144855 A1* | 5/2016 | Saito | B60W 10/06 701/70 |
| 2019/0001965 A1* | 1/2019 | Cho | B60W 30/025 |
| 2019/0023095 A1* | 1/2019 | Ficca | B60W 20/15 |
| 2020/0198624 A1* | 6/2020 | Akatsuka | B60W 10/18 |
| 2020/0361464 A1* | 11/2020 | Noguchi | B60T 13/662 |
| 2021/0094534 A1* | 4/2021 | Hyun | B60W 10/04 |
| 2021/0229646 A1* | 7/2021 | Kim | B60T 8/3215 |
| 2021/0331677 A1* | 10/2021 | Kim | B60W 40/10 |
| 2021/0339744 A1* | 11/2021 | Rollinger | B60W 30/143 |
| 2021/0379953 A1* | 12/2021 | Furuta | B60G 17/0165 |
| 2021/0379955 A1* | 12/2021 | Furuta | B60G 17/0165 |
| 2021/0379956 A1* | 12/2021 | Furuta | B60G 17/06 |
| 2022/0063420 A1* | 3/2022 | Yoon | B60K 17/356 |
| 2022/0111695 A1* | 4/2022 | Furuta | B60G 17/018 |
| 2022/0169215 A1* | 6/2022 | Muramatsu | B60T 8/1766 |
| 2022/0185283 A1* | 6/2022 | Kim | B60W 10/04 |

FOREIGN PATENT DOCUMENTS

| | | | |
|---|---|---|---|
| JP | 2005312190 A | | 11/2005 |
| JP | 2006-069395 A | | 3/2006 |
| JP | 2007118898 A | * | 5/2007 |
| JP | 2009113772 A | | 5/2009 |
| JP | 2009184522 A | * | 8/2009 |
| JP | 2013085375 A | | 5/2013 |
| JP | 2016025783 A | * | 2/2016 |
| JP | 2020-196410 A | | 12/2020 |
| JP | 2021115882 A | * | 8/2021 |
| WO | 2013069126 A1 | | 5/2013 |

* cited by examiner

DRIVING FORCE CONTROL METHOD AND DRIVING FORCE CONTROL DEVICE

TECHNICAL FIELD

The present invention relates to a driving force control method and a driving force control device.

BACKGROUND ART

JP 2006-69395 A proposes a driving force control method that provides a difference in driving torque between a front wheel and a rear wheel depending on a driving environment of a vehicle. In particular, in this driving force control method, during traveling on a bad road, a difference is given to driving force between the front wheel and the rear wheel to lift up a vehicle body, thereby improving traveling performance.

SUMMARY OF INVENTION

When the vehicle is traveling on the bad road, it is conceivable that an occupant may feel uncomfortable due to a vibration when the vehicle crosses a step. However, control in JP 2006-69395 A focuses on improving traveling performance, and does not provide any measures to reduce the vibration applied to the occupant.

Therefore, an object of the present invention is to provide a driving force control method and a driving force control device capable of reducing a vibration applied to an occupant when a vehicle passes through a step.

According to an aspect of the present invention, provided is a driving force control method for controlling front wheel driving force and rear wheel driving force by a front wheel motor connected to a front wheel of a vehicle and a rear wheel motor connected to a rear wheel, respectively. The driving force control method includes executing a step corresponding control of adjusting driving force of the front wheel motor and driving force of the rear wheel motor when the vehicle passes through a step. In the step corresponding control, after a front wheel ride-up timing at which the front wheel rides up the step and before a rear wheel ride-up timing at which the rear wheel rides up the step, a first control mode in which the front wheel motor is regenerated and the rear wheel motor is powered is executed, and after the execution of the first control mode and before the rear wheel ride-up timing, a second control mode in which the front wheel motor is powered and the rear wheel motor is regenerated is executed.

DESCRIPTION OF EMBODIMENTS

Hereinafter, embodiments of the present invention will be described in detail with reference to the drawings.

First Embodiment

Figure 1:
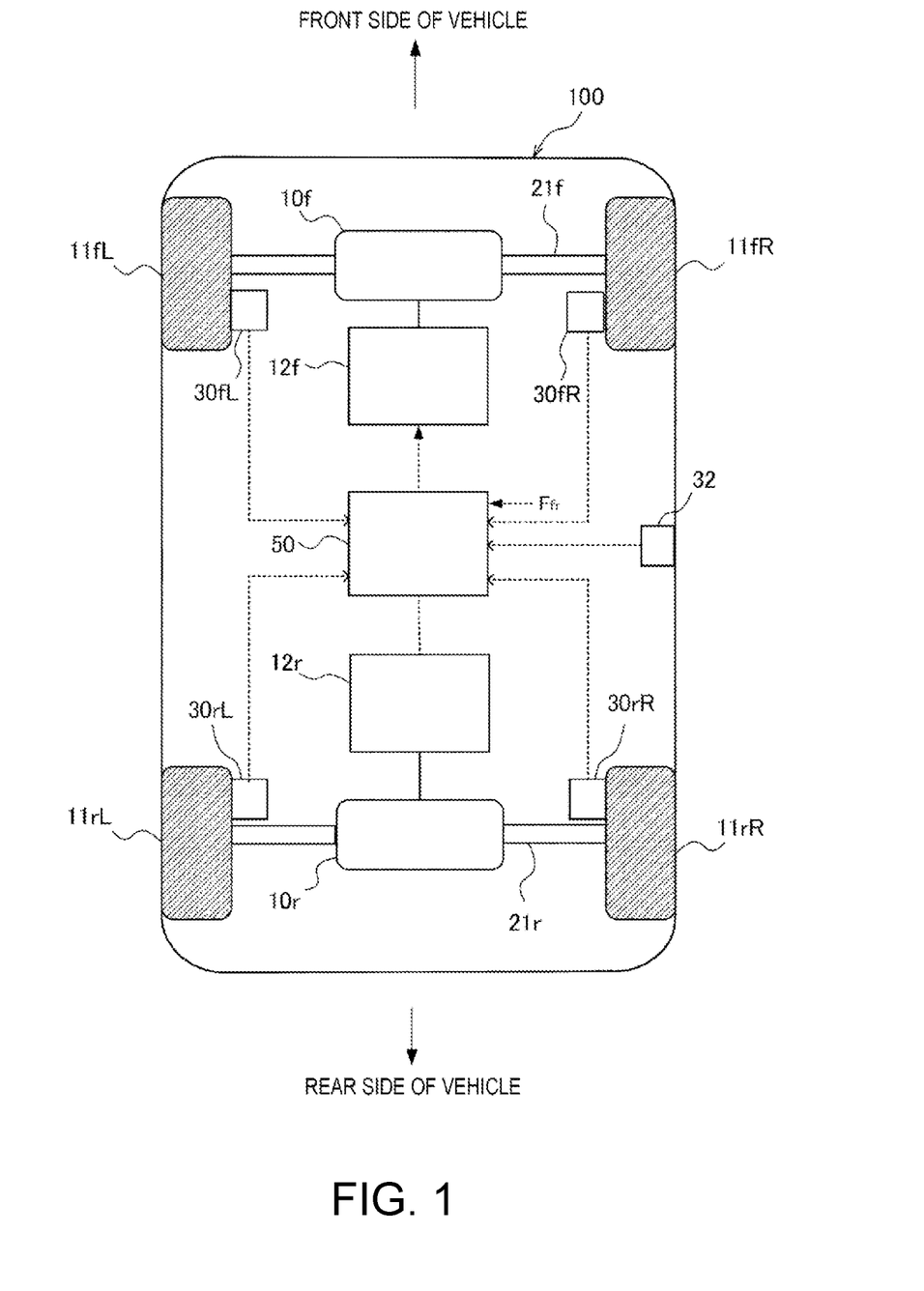
FIG. 1 is a diagram illustrating a configuration of a vehicle in which a driving force control method according to an embodiment of the present invention is executed.

FIG. 1 is a diagram illustrating a configuration of a vehicle 100 in which a driving force control method according to the present embodiment is executed.

As the vehicle 100 according to the present embodiment, an electric vehicle, a hybrid vehicle, or the like, which includes a drive motor 10 serving as a driving source and can travel by driving force of the drive motor 10, is assumed.

The drive motor 10 includes a front wheel motor 10f provided at a front position (front wheel side) of the vehicle 100 to drive front wheels 11f, and a rear wheel motor 10r provided at a rear position (rear wheel side) to drive rear wheels 11r.

The front wheel motor 10f is implemented by a three-phase AC motor. During power running, the front wheel motor 10f is supplied with electric power from an in-vehicle battery (not shown) to generate driving force. The driving force generated by the front wheel motor 10f is transmitted to the front wheels 11f via a front wheel transmission 16f and a front wheel drive shaft 21f. On the other hand, during regeneration, the front wheel motor 10f converts regenerative braking force of the front wheels 11f into AC power and supplies the AC power to the in-vehicle battery.

On the other hand, the rear wheel motor 10r is implemented by a three-phase AC motor. During power running, the rear wheel motor 10r is supplied with electric power from the in-vehicle battery to generate driving force. The driving force generated by the rear wheel motor 10r is transmitted to the rear wheels 11r via a rear wheel transmission 16r and a rear wheel drive shaft 21r. During regeneration, the rear wheel motor 10r converts regenerative braking force of the rear wheels 11r into AC power and supplies the AC power to the in-vehicle battery.

An inverter 12 includes a front wheel inverter 12f that adjusts the electric power (positive in the power running and negative in the regeneration) supplied to the front wheel motor 10f, and a rear wheel inverter 12r that adjusts the electric power (positive in the power running and negative in the regeneration) supplied to the rear wheel motor 10r.

The front wheel inverter 12f adjusts the electric power supplied to the front wheel motor 10f such that driving force (hereinafter, also referred to as "front wheel driving force $F_f$") determined for total driving force (hereinafter, also referred to as "total requested driving force $F_{fr}$") requested for the vehicle 100 is achieved. On the other hand, the rear wheel inverter 12r adjusts the electric power supplied to the rear wheel motor 10r such that driving force (hereinafter, also referred to as "rear wheel driving force $F_r$") determined for the total requested driving force $F_{fr}$ is achieved.

In particular, the front wheel driving force $F_f$ and the rear wheel driving force $F_r$ in the present embodiment are determined such that a sum thereof matches the total requested driving force $F_{fr}$. The total requested driving force $F_{fr}$ is determined based on, for example, an operation amount (accelerator opening) for an accelerator pedal mounted on the vehicle 100, or a command from a prescribed autonomous driving system (autonomous driving control device) such as an advanced driver assistance systems (ADAS) or autonomous driving (AD).

The vehicle 100 is further provided with a controller 50 serving as a driving force control device that controls the front wheel driving force $F_f$ and the rear wheel driving force $F_r$.

The controller 50 is implemented by a computer including a central processing unit (CPU), a read-only memory (ROM), a random access memory (RAM), and an input/output interface (I/O interface), and is programmed so as to execute each processing in vehicle control to be described below. In particular, a function of the controller 50 can be achieved by any in-vehicle computer such as a vehicle control module (VCM), a vehicle motion controller (VMC), and a motor controller, and/or a computer provided outside the vehicle 100. The controller 50 may be implemented by one piece of computer hardware, or may be implemented by distributing various processes by a plurality of pieces of computer hardware.

The controller 50 controls the front wheel driving force $F_f$ and the rear wheel driving force $F_r$ using the total requested driving force $F_{fr}$, detection values of vertical acceleration sensors 30fL, 30fR on the front wheel side, detection values of vertical acceleration sensors 30rL, 30rR on the rear wheel side, a detection value of a GPS vehicle speed sensor 32, and the like as input information. More specifically, the controller 50 issues commands to the front wheel inverter 12f and the rear wheel inverter 12r so as to achieve desired front wheel driving force $F_f$ and desired rear wheel driving force $F_r$.

In particular, in the present embodiment, the controller 50 performs either basic drive control or step corresponding control as control that defines driving force distribution during forward traveling (particularly, during acceleration) of the vehicle 100.

The controller 50 executes the basic drive control during normal traveling (in the present embodiment, a scene other than when the vehicle 100 passes through a step Bu to be described later). In the basic drive control, the controller 50 sets the front wheel driving force $F_f$ and the rear wheel driving force $F_r$ to prescribed basic front wheel driving force and prescribed basic rear wheel driving force, respectively.

Here, the basic front wheel driving force and the basic rear wheel driving force are values determined by experiments, simulations, or the like so that vehicle characteristics (in particular, power consumption performance) of the vehicle 100 take desired characteristics according to a traveling scene. Specific values of the basic front wheel driving force and the basic rear wheel driving force may be appropriately changed in accordance with a specification of the vehicle 100 and the traveling scene. For example, when the vehicle 100 travels straight on a flat paved road at a constant speed, a distribution ratio of the basic front wheel driving force and the basic rear wheel driving force to the total requested driving force $F_{fr}$ can be set to 50:50.

On the other hand, under the execution of the basic drive control, the controller 50 executes the step corresponding control of reducing vibration applied to an occupant of the vehicle 100 in a scene in which the vehicle 100 passes through the prescribed step Bu based on various input information. In the step corresponding control, the controller 50 sequentially executes a first control mode and a second control mode.

More specifically, the controller 50 executes the first control mode after a timing (hereinafter, also referred to as a "front wheel ride-up timing T1") at which the front wheels 11f ride up the step Bu is detected and before a timing (hereinafter, also referred to as a "rear wheel ride-up timing T2") at which the rear wheels 11r ride up the step Bu.

In the first control mode, the controller 50 sets the front wheel driving force $F_f$ to a negative value and sets the rear wheel driving force $F_r$ to a positive value. That is, the controller 50 performs power running of the rear wheel motor 10r (power-drives the rear wheels 11r) while regenerating the front wheel motor 10f (regeneratively braking the front wheels 11f).

On the other hand, the controller 50 executes the second control mode after the execution of the first control mode and before the rear wheel ride-up timing T2.

In the second control mode, the controller 50 sets the front wheel driving force $F_f$ to a positive value and sets the rear wheel driving force $F_r$ to a negative value. That is, the front wheel motor 10f is powered (the front wheels 11f are power-driven) and the rear wheel motor 10r is regenerated (the rear wheels 11r are regeneratively braked).

Specific values of the front wheel driving force $F_f$ and the rear wheel driving force $F_r$ set in the first control mode or the second control mode are not limited to specific numerical values, and can be appropriately adjusted according to a situation.

That is, in the present embodiment, in the scene in which the vehicle 100 passes through the step Bu, driving force control performed by the controller 50 is switched from the basic drive control to the step corresponding control at an appropriate timing. Further, in the step corresponding control, the driving force control transitions in an order of the first control mode and the second control mode at an appropriate timing.

Accordingly, force (pitching force $F_{pi}$) in a pitch direction (nose down direction or the nose up direction) acting on the vehicle 100 is adjusted according to the driving force distribution of the front wheel driving force $F_f$ and the rear wheel driving force $F_r$, so that the vibration at the time of passing through the step Bu can be reduced. Hereinafter, a relationship between adjustment of the front wheel driving force $F_f$ and the rear wheel driving force $F_r$ under the step corresponding control and the reduction of the vibration when the vehicle 100 passes through the step Bu will be described more specifically.

Figure 2:
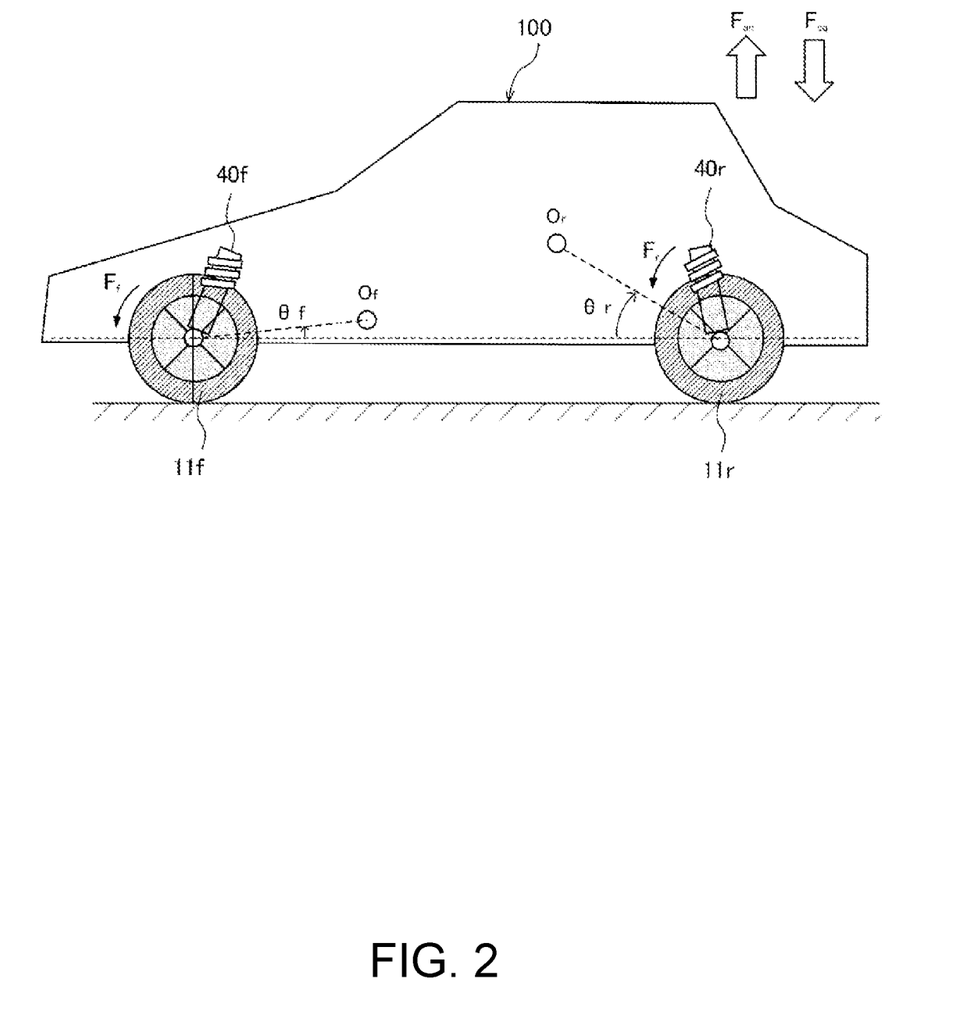
FIG. 2 is a diagram showing a schematic structure of a chassis system of the vehicle.

FIG. 2 is a diagram illustrating a schematic structure (particularly, an outline of a suspension geometry) of a chassis system of the vehicle 100. In the figure, "$O_f$" represents a virtual rotation center (instantaneous rotation center) in the pitch direction of a vehicle body front portion, and "$O_r$" represents a virtual rotation center (instantaneous rotation center) in the pitch direction of a vehicle body rear portion.

When the vehicle 100 is traveling forward, when the regenerative braking force (force in a direction opposite to a traveling direction) is applied to the front wheels 11f and power running driving force (force in the same direction as the traveling direction) is applied to the rear wheels 11r, anti-squat force Fan (force for lifting a vehicle body) acts on the vehicle body. On the other hand, when power running driving force is applied to the front wheels 11f and regenerative braking force is applied to the rear wheels 11r, squat force $F_{sq}$ (force for causing the vehicle body to sink) acts on the vehicle body.

Here, a magnitude of the anti-squat force Fan or the squat force $F_{sq}$ that can be achieved by adjusting the driving force distribution of the front wheel driving force $F_f$ and the rear wheel driving force $F_r$ depends on a magnitude of an anti-squat angle θ according to a suspension structure. In particular, as shown in FIG. 2, when a structure in which a front anti-squat angle $\theta_f$ is smaller than a rear anti-squat angle $\theta_r$ is adopted in consideration of ride comfort, nose dive feeling during braking, and the like, the anti-squat force $F_{an}$ or the squat force $F_{sq}$ acts more strongly on the vehicle body rear portion than on the vehicle body front portion by adjusting the driving force distribution.

Therefore, by applying the regenerative braking force to the front wheels 11f and the power running driving force to the rear wheels 11r during the forward traveling (by executing the first control mode), the vehicle body rear portion can be lifted up (the vehicle body can be nosed down). On the other hand, by applying the power running driving force to the front wheels 11f and the regenerative braking force to the rear wheels 11r (by executing the second control mode), the vehicle body rear portion can be lifted down (the vehicle body can be nosed up).

Focusing on the above points, in the present embodiment, by switching lift up and lift down of the vehicle body rear portion at an appropriate timing using the above step corresponding control, a vibration prevention effect achieved by a spring of a rear suspension 40r is enhanced, and shock is reduced when the vehicle 100 passes through the step Bu. Hereinafter, specific processing in the step corresponding control will be described.

Figure 3:
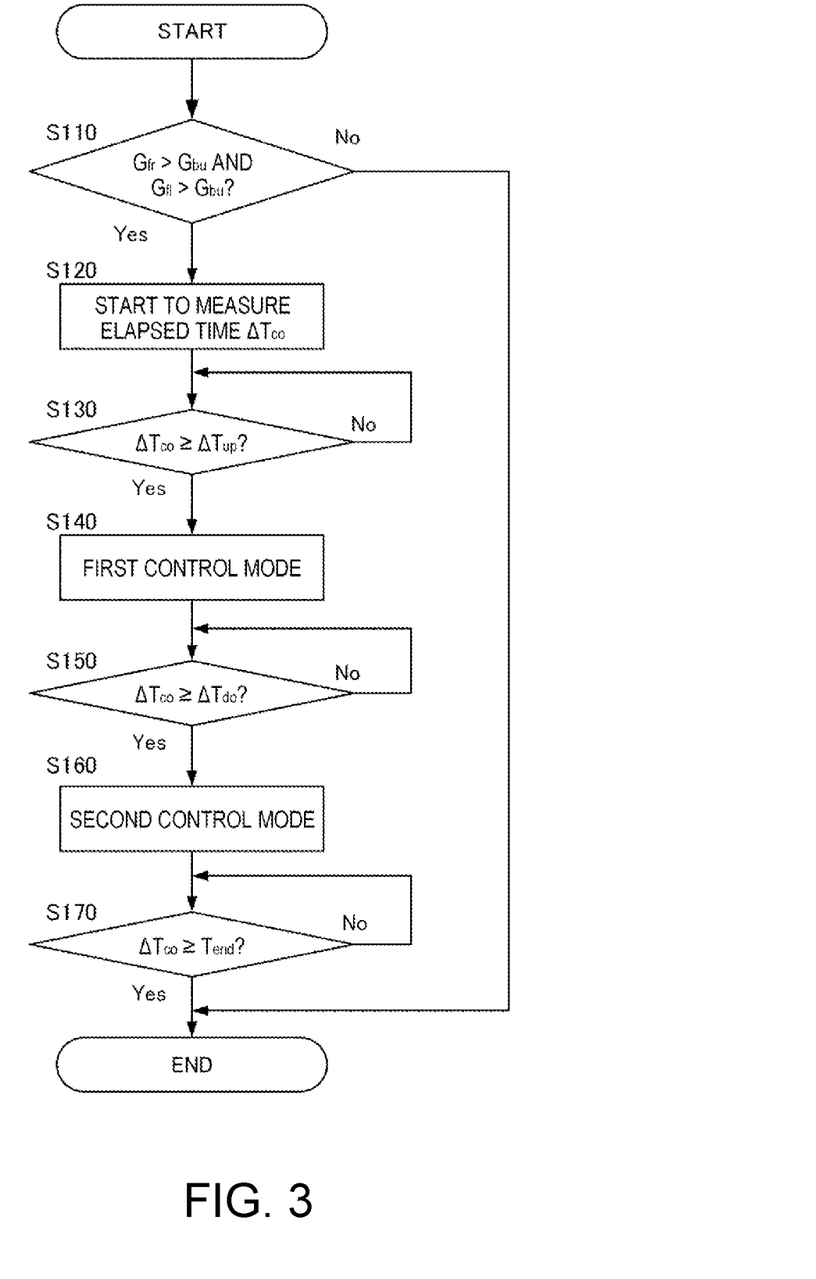
FIG. 3 is a flowchart illustrating step corresponding control.

FIG. 3 is a flowchart illustrating the step corresponding control. While the vehicle 100 is traveling forward, the controller 50 repeatedly executes processes shown in FIG. 3 at prescribed calculation intervals.

In step S110, the controller 50 determines whether both of the detection values (hereinafter, also referred to as "front fL vertical $G_{fl}$" and "front fR vertical $G_{fr}$") of the vertical acceleration sensors 30fL, 30fR on the front wheel side exceed a prescribed step determination threshold value $G_{bu}$.

The determination is a preliminary process for detecting a scene in which the step corresponding control (steps S120 to S170) is to be executed. Here, the step determination threshold value $G_{bu}$ is determined in advance to a suitable value through the experiments, the simulations, and the like from the viewpoint of determining whether the step Bu is large enough to cause a vibration that cause discomfort to the occupant of the vehicle 100 when the wheels ride up the step Bu.

Further, if the controller 50 determines that both the front fL vertical $G_{fl}$ and the front fR vertical $G_{fr}$ exceed the step determination threshold value $G_{bu}$, the controller 50 executes the step corresponding control from step S120 onwards, and otherwise ends this routine.

That is, when both of wheels constituting the front wheels 11f (left front wheel 11fL and right front wheel 11fR shown in FIG. 1) ride up the step Bu, the step corresponding control is executed, and when at least one of the left front wheel 11fL and the right front wheel 11fR (only one wheel) rides up the step Bu, the step corresponding control is not executed and the basic drive control is maintained.

Next, in step S120, the controller 50 starts to measure an elapsed time $\Delta T_{co}$ with the timing (that is, the front wheel ride-up timing T1) at which the controller 50 detects in step S110 that the front wheels 11f have ridden up the step Bu as a base point.

Further, in step S130, the controller 50 determines whether the elapsed time $\Delta T_{co}$ is equal to or longer than a prescribed first switching determination time $\Delta T_{up}$.

The first switching determination time $\Delta T_{up}$ is set to a suitable value from the viewpoint of defining a timing of switching from basic drive control to the first control mode. In particular, the first switching determination time $\Delta T_{up}$ is determined such that a control mode is switched to the second control mode at a time point at which the rear wheels 11r ride up the step Bu after the basic drive control of achieving preferable vehicle characteristics (such as optimal power consumption) is continued as long as possible even after the front wheels 11f ride up the step Bu.

More specifically, the controller 50 first estimates an estimated value (hereinafter, also referred to as "estimated travel distance $D_{T \geq T1}$") of a distance that the vehicle 100 will travel from then on using the front wheel ride-up timing T1 as a base point. In particular, the estimated travel distance $D_{T \geq T1}$ can be determined as a function of the elapsed time $\Delta T_{co}$ using a detection value (for example, GPS vehicle body speed $V_{GPS}$) or an estimated value of a vehicle speed V and a wheel speed w (or a wheel rotation speed $N_w$).

Further, the controller 50 determines a first scheduled switching time $T_a$, which is a time when the calculated estimated travel distance $D_{T \geq T1}$ becomes equal to a value obtained by subtracting a margin $\alpha$ from a distance between the front wheels 11f and the rear wheels 11r. Further, the controller 50 determines a time from the front wheel ride-up timing T1 to the first scheduled switching time $T_a$ as the first switching determination time $\Delta T_{up}$.

The margin $\alpha$ is set to a suitable value that allows switching from the first control mode to the second control mode to be completed before the rear wheel ride-up timing T2 while maintaining the basic drive control of achieving the preferable vehicle characteristics as long as possible after the front wheel ride-up timing T1.

Further, when the controller 50 determines that the elapsed time $\Delta T_{co}$ is equal to or longer than the first switching determination time $\Delta T_{up}$, the controller 50 executes a process of step S140.

In step S140, the controller 50 executes the first control mode. More specifically, the controller 50 switches the driving force control from the basic drive control in which both the front wheel driving force $F_f$ and the rear wheel driving force $F_r$ are set to be positive to the first control mode in which the front wheel driving force $F_f$ is set to be negative and the rear wheel driving force $F_r$ is set to be positive.

Next, in step S150, the controller 50 determines whether the elapsed time $\Delta T_{co}$ is equal to or longer than a prescribed second switching determination time $\Delta T_{do}$.

The second switching determination time $\Delta T_{do}$ is set to a suitable value from the viewpoint of defining a switching timing from the first control mode to the second control mode. In particular, the second switching determination time $\Delta T_{do}$ is set to an appropriate value such that the control mode is switched to the second control mode at the rear wheel ride-up timing T2 while maintaining a time (time interval from the front wheel ride-up timing T1 to the first scheduled switching time Ta) for which the first control mode is continued at a certain value or more.

More specifically, the controller 50 determines a second scheduled switching time $T_b$, which is a time when the estimated travel distance $D_{T \geq T1}$ calculated in step S130 becomes equal to the distance between the front wheels 11f and the rear wheels 11r. Further, the controller 50 determines a time from the front wheel ride-up timing T1 to the second scheduled switching time $T_b$ as the second switching determination time $\Delta T_{do}$. That is, the second switching determination time $\Delta T_{do}$ is determined such that the second scheduled switching time $T_b$ is substantially the same as the rear wheel ride-up timing T2. In consideration of a control delay and the like, the second switching determination time $\Delta T_{do}$ may be determined such that the second scheduled switching time $T_b$ is earlier than the rear wheel ride-up timing T2.

Further, when the controller 50 determines that the elapsed time $\Delta T_{co}$ is equal to or longer than the second switching determination time $\Delta T_{do}$, the controller 50 executes a process of step S160.

In step S160, the controller 50 executes the second control mode. More specifically, the driving force control is switched from the first control mode in which the front wheel driving force $F_f$ is set to be negative and the rear wheel driving force $F_r$ is set to be positive to the second control mode in which the front wheel driving force $F_f$ is set to be positive and the rear wheel driving force $F_r$ is set to be negative.

Further, in step S170, when the controller 50 determines that the elapsed time $\Delta T_{co}$ is equal to or longer than a prescribed control continuation time $\Delta T_{end}$ (when a control continuation timing $T_{end}$ is reached), the controller 50 returns the control mode from the second control mode to the basic drive control and ends this routine.

Figure 4A:
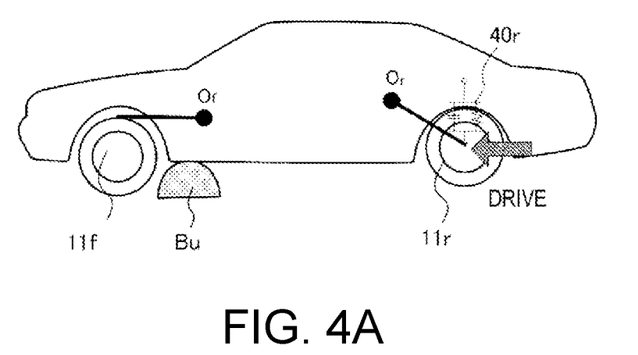
FIG. 4A is a diagram illustrating an operation and effect of executing the step corresponding control.
Figure 4B:
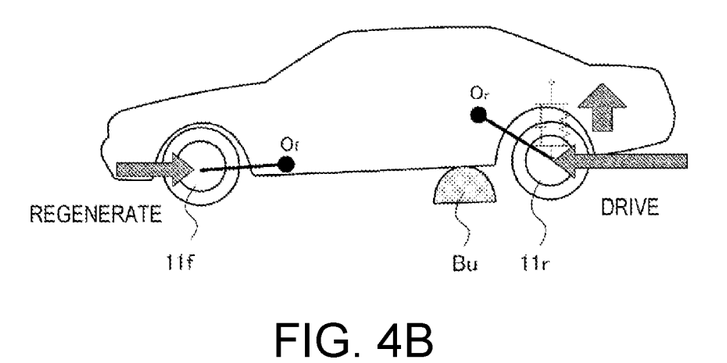
FIG. 4B is a diagram illustrating an operation and effect of executing the step corresponding control.
Figure 4C:
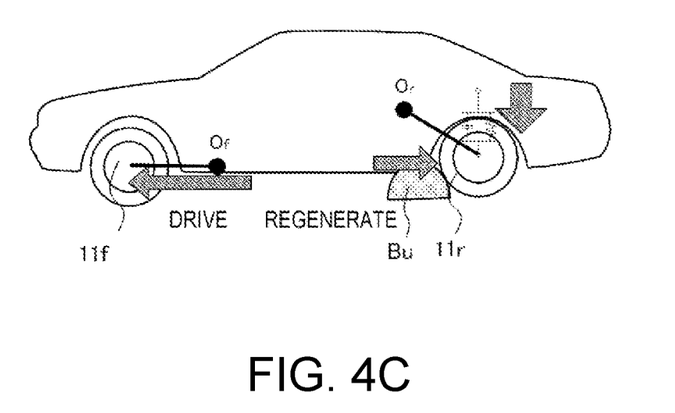
FIG. 4C is a diagram illustrating an operation and effect of executing the step corresponding control.

FIGS. 4A to 4C are diagrams illustrating an operation and effect achieved by executing the step corresponding control.

By executing the step corresponding control, when the first switching determination time $\Delta T_{up}$ elapses from the front wheel ride-up timing T1 (FIG. 4A) at which the front wheels 11f ride up the step Bu, the control mode is switched from the basic drive control to the first control mode, the anti-squat force $F_{an}$ acts on the vehicle 100, and the vehicle body rear portion is lifted up (FIG. 4B). Accordingly, the rear suspension 40r extends more than in the case in which the driving force distribution under the basic drive control is set.

Thereafter, immediately before the rear wheel ride-up timing T2 at which the rear wheels 11r ride up the step Bu (when the first switching determination time $\Delta T_{up}$ elapses from the front wheel ride-up timing T1 (FIG. 4A) from an one-step arrival timing T1 (FIG. 4A)), the control mode is switched from the first control mode to the second control mode, and the squat force $F_{sq}$ acts on the vehicle 100 to lift down the vehicle body rear portion (FIG. 4C). Accordingly, force in a direction of causing the rear suspension 40r (more specifically, downward force) to contract acts on the rear suspension 40r in a state of being extended under the first control mode.

Therefore, compressive force of the rear suspension 40r extended in the first control mode (anti-squat force $F_{an}$) and the downward force acting on the rear suspension 40r in the second control mode (squat force $F_{sq}$) are mutually affected, and damping force (resistance force) of the rear suspension 40r as viewed from a vehicle body structure portion (including an inside of the a vehicle cabin) above the rear suspension 40r is reduced (the rear suspension 40r is softened). Therefore, the vibration inside the vehicle cabin is reduced when the rear wheels 11r ride up the step Bu, and the ride comfort of the occupant is further improved.

Figure 5:
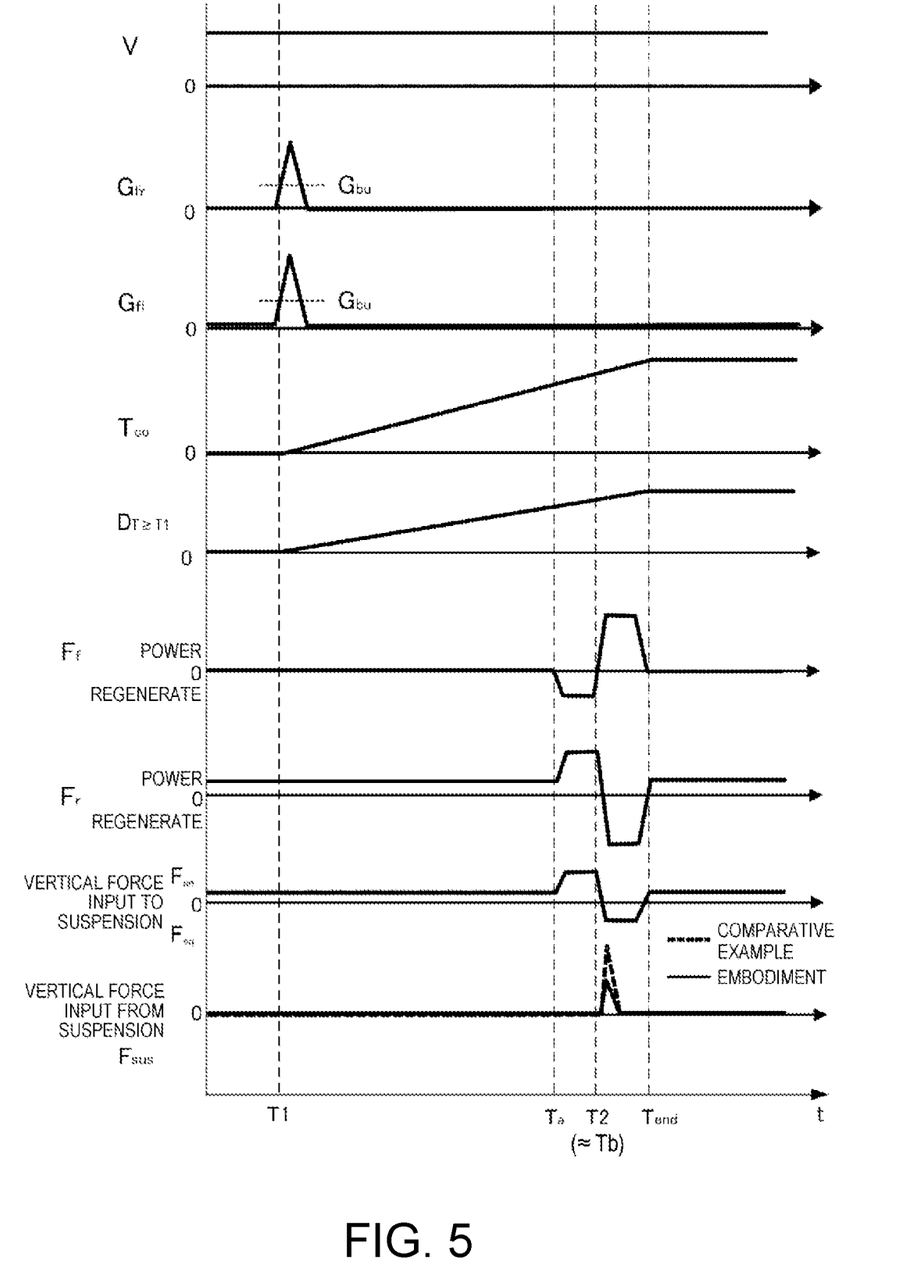
FIG. 5 is a timing chart showing an example of a result of executing the step corresponding control.

FIG. 5 is a timing chart illustrating an example of a control result of the step corresponding control. As shown in the figure, vertical force $F_{sus}$ (see a solid line) input from the rear suspension 40r to an upper vehicle body structure in the present embodiment is reduced compared to a comparative example (see a broken line) in which the step corresponding control is not executed (the basic drive control is maintained even when the vehicle passes through the step Bu).

Hereinafter, a configuration of the above-described present embodiment and an operation and effect thereof will be collectively described.

The present embodiment provides the driving force control method for controlling the front wheel driving force $F_f$ and the rear wheel driving force $F_r$ by the front wheel motor 10f connected to the front wheels 11f of the vehicle 100 and the rear wheel motor 10r connected to the rear wheels 11r, respectively.

In this driving force control method, when the vehicle 100 passes through the step Bu, the step corresponding control (steps S120 to S170) for adjusting the front wheel driving force $F_f$ and the rear wheel driving force $F_r$ is executed. Further, in the step corresponding control, after the front wheel ride-up timing T1 at which the front wheels 11f ride up the step Bu and before the rear wheel ride-up timing T2 at which the rear wheels 11r ride up the step Bu, the first control mode in which the front wheel motor 10f is regenerated and the rear wheel motor 10r is powered is executed (steps S120 to S140), and after the execution of the first control mode and before the rear wheel ride-up timing T2 (before or at the same time as the rear wheel ride-up timing T2), the second control mode in which the front wheel motor 10f is powered and the rear wheel motor 10r is regenerated is executed (steps S150 to S170).

Accordingly, the driving force distribution of the front wheel driving force $F_f$ and the rear wheel driving force $F_r$ can be adjusted such that vertical displacement of the vehicle 100 that reduces the damping force of the rear suspension 40r is achieved before and after the rear wheels 11r ride up the step Bu. Accordingly, the vibration transmitted to the vehicle cabin can be reduced when the vehicle 100 passes through the step Bu, and the ride comfort of the occupant can be further improved.

In the present embodiment, when the prescribed first switching determination time $\Delta T_{up}$ elapses from the front wheel ride-up timing T1, the first control mode is started (step S130 and step S140).

Therefore, it is possible to achieve specific control logic for switching to the first control mode while continuing the basic drive control of achieving the preferable vehicle characteristics (such as optimal power consumption) for as long as possible. In particular, by determining the first switching determination time $\Delta T_{up}$ according to the vehicle speed V, the switching from the basic drive control to the first control mode can be executed at a more appropriate timing.

Further, in the present embodiment, when the second switching determination time $\Delta T_{do}$, which is longer than the first switching determination time $\Delta T_{up}$, elapses from the front wheel ride-up timing T1, the second control mode is started (step S150 and step S160).

Accordingly, it is possible to achieve a specific control logic for performing the first control mode and the second control mode before the rear wheel ride-up timing T2 at which the rear wheels 11r ride up the step Bu. In particular, by determining the second switching determination time $\Delta T_{do}$ according to the vehicle speed V, the switching from the first control mode to the second control mode can be executed at a more appropriate timing.

Further, the driving force control method according to the present embodiment executes a step determination process of determining whether the vehicle 100 passes through the step Bu (step S110).

Further, in the step determination process, when both of the front wheels 11f (left front wheel 11fL and right front wheel 11fR) are detected to have crossed the step Bu, the vehicle 100 is determined to pass through the step Bu. On the other hand, when at least one of the wheels is not detected to have crossed the step Bu, the vehicle 100 is determined to not pass through the step Bu.

Further, when the vehicle 100 is determined to pass through the step Bu, the step corresponding control is executed (Yes in step S110). On the other hand, when the vehicle 100 is determined to not pass through the step Bu, the basic drive control is executed to set each of the front wheel driving force $F_f$ and the rear wheel driving force $F_r$ to prescribed basic driving force (basic front wheel driving force and basic rear wheel driving force) (No in step S110).

Accordingly, since the front wheels 11f ride up the step Bu but the rear wheels 11r do not ride up the step Bu, it is possible to determine a scene in which the step corresponding control is unnecessary (for example, a scene in which only one of the front wheels 11f rides up the step Bu during turning of the vehicle 100 or the like), and to maintain basic driving force distribution that achieves suitable vehicle characteristics in the scene.

Further, in the present embodiment, the controller 50 that functions as the driving force control device that executes the driving force control method is provided. The controller 50 controls the front wheel driving force $F_f$ and the rear wheel driving force $F_r$ by the front wheel motor 10f connected to the front wheels 11f of the vehicle 100 and the rear wheel motor 10r connected to the rear wheels 11r, respectively.

In particular, the controller 50 includes a step corresponding control unit (FIG. 3) that adjusts the front wheel driving force $F_f$ and the rear wheel driving force $F_r$ when the vehicle 100 passes through the step Bu. Further, the step corresponding control unit executes, after the front wheel ride-up timing T1 at which the front wheels 11f ride up the step Bu and before the rear wheel ride-up timing T2 at which the rear wheels 11r ride up the step Bu, the first control mode in which the front wheel motor 10f is regenerated and the rear wheel motor 10r is powered (steps S110 to S140), and executes, after the execution of the first control mode and before the rear wheel ride-up timing T2 (before or at the same time as the rear wheel ride-up timing T2), the second control mode in which the front wheel motor 10f is powered and the rear wheel motor 10r is regenerated (steps S150 to S170).

Accordingly, a configuration of the control device suitable for executing the driving force control method is achieved.

Second Embodiment

Hereinafter, a second embodiment will be described. The same elements as those in the first embodiment are denoted by the same reference numerals, and the description thereof is omitted. In particular, in the present embodiment, regarding a tire diameter R, which changes due to factors such as aging, a tire diameter learning process is executed to obtain a learning value (hereinafter also referred to as a "tire diameter learning value $R_L$") that takes into account the change.

In particular, in the tire diameter learning process, assuming a scene in which the vehicle 100 passes through the step Bu as in the case of the step corresponding control described above, the basic drive control is set, a time from a timing at which the front wheels 11f ride up the step Bu to a timing at which the rear wheels 11r ride up the step Bu is measured, and the tire diameter learning value $R_L$ is determined based on the time.

Hereinafter, for convenience of description, the same reference numerals are used for parameters similar to control parameters described in the step corresponding control of the first embodiment.

Figure 6:
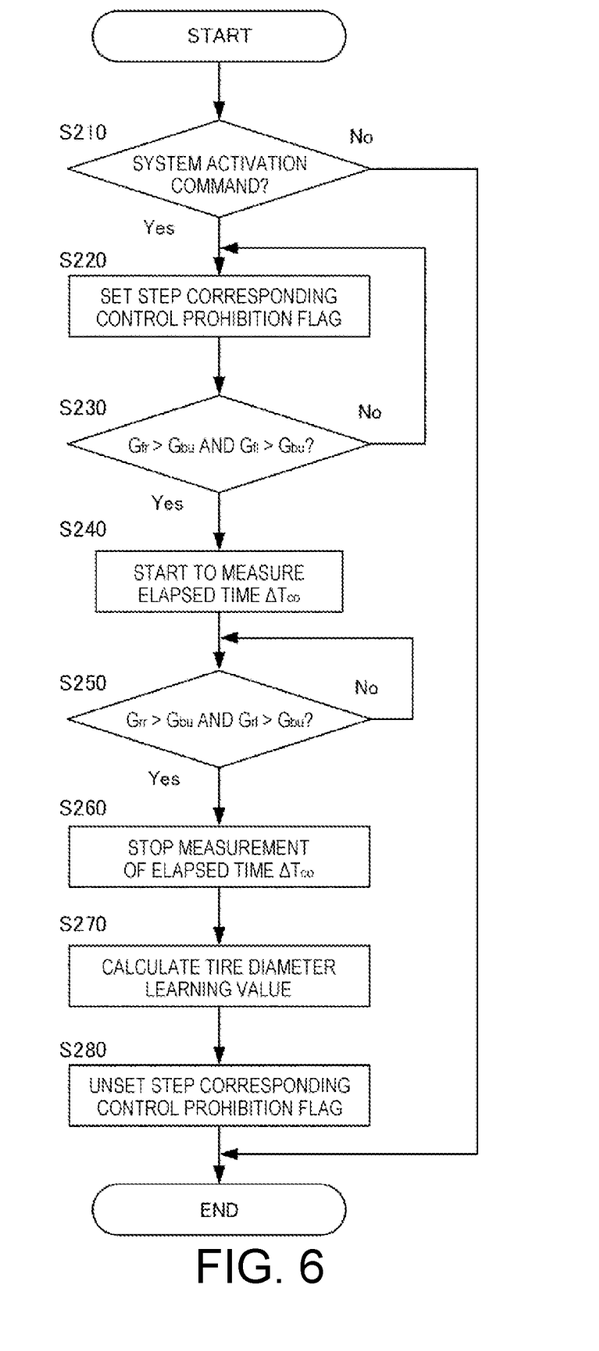
FIG. 6 is a flowchart illustrating a tire diameter learning process.

FIG. 6 is a flowchart illustrating the tire diameter learning process according to the present embodiment. The controller 50 executes processes shown in FIG. 6 when a vehicle system (a system that achieves traveling of the vehicle 100 and other auxiliary functions thereof) is activated.

As shown in the figure, in step S210, the controller 50 determines whether a system activation command for the vehicle 100 is detected. Here, the system activation command according to the present embodiment means a signal generated in response to an operation (for example, an ON operation of an ignition switch) of an occupant requesting the activation of the vehicle system.

Further, when the controller 50 detects the system activation command, the controller 50 executes processes from step S220 onwards, and otherwise ends the tire diameter learning process.

Next, in step S220, the controller 50 sets a step corresponding control prohibition flag. The step corresponding control prohibition flag is a flag for prohibiting the execution of the step corresponding control (steps S120 to S170) described in FIG. 3. That is, in the present embodiment, the controller 50 refers to the step corresponding control prohibition flag before starting each process shown in FIG. 3 (or before starting the process of step S120), and does not execute the step corresponding control when the flag is set.

In step S230, the controller 50 determines whether both the front fL vertical $G_{fl}$ and the front fR vertical $G_{fr}$ exceed the step determination threshold value $G_{bu}$. This determination is executed to detect a state in which the front wheels 11f ride up the step Bu as in step S120 of FIG. 3. Further, when the controller 50 determines that both the front fL vertical $G_{fl}$ and the front fR vertical $G_{fr}$ exceed the step determination threshold value $G_{bu}$, the controller 50 executes processes from step S240 onwards.

Next, in step S240, the controller 50 starts to measure the elapsed time $\Delta T_{co}$ based on a timing detected in step S230 at which the front wheels 11f ride up the step Bu.

In step S250, the controller 50 determines whether both a detection value of a rear rL vertical acceleration sensor 30rL (hereinafter also referred to as "rear rL vertical $G_{rl}$") and a detection value of a rear rR vertical acceleration sensor 30rR (hereinafter also referred to as "rear rR vertical $G_{rr}$") exceed the step determination threshold value $G_{bu}$. This determination is executed to detect a state in which the rear wheels 11r have ridden up the step Bu.

Further, when the controller 50 determines that both the rear rL vertical $G_{rl}$ and the rear rR vertical $G_{rr}$ exceed the step determination threshold value $G_{bu}$, the controller 50 executes processes from step S260 onwards.

Next, in step S260, the controller 50 stops the measurement of the elapsed time $\Delta T_{co}$ at the timing at which positive determination is made in step S250 (the timing at which the rear wheels 11r have ridden up the step Bu), and records the elapsed time $\Delta T_{co}$. That is, the elapsed time $\Delta T_{co}$ corresponds to a period from when the front wheels 11f ride up the step Bu to when the rear wheels 11r ride up the step Bu. For convenience of description, this is hereinafter also referred to as a "front and rear wheel run-onto time $\Delta T_{f \to r}$".

In step S270, the controller 50 calculates the tire diameter learning value $R_L$ from the following equation (1) based on the GPS vehicle body speed $V_{GPS}$, the wheel rotation speed $N_w$, and the front and rear wheel run-onto time $\Delta T_{f \to r}$, which are input from a sensor (not shown) or the like.

[Equation 1]

$$R_L = \frac{\int_0^{\Delta T_{f \to r}} V_{GPS} \cdot dT}{\int_0^{\Delta T_{f \to r}} N_w \cdot dT} \quad (1)$$

In step S280, the controller 50 records the obtained tire diameter learning value $R_L$, cancels the step corresponding control prohibition flag set in step S220, and ends the tire diameter learning process. When the tire diameter learning process ends in a state in which the step corresponding control prohibition flag is cancelled, the controller 50 is allowed to execute the subsequent step corresponding control.

Further, the controller 50 calculates the vehicle speed V, which is used to obtain the first switching determination time $\Delta T_{up}$ and the second switching determination time $\Delta T_{do}$ described above, using the tire diameter learning value $R_L$ obtained in the tire diameter learning process in the subsequent step corresponding control (particularly, step S130 and step S150). That is, the first switching determination time $\Delta T_{up}$ and the second switching determination time $\Delta T_{do}$ are set to be variable values according to the vehicle speed V based on the tire diameter learning value $R_L$.

Hereinafter, a configuration of the above-described present embodiment and an operation and effect thereof will be collectively described.

In the driving force control method according to the present embodiment, the tire diameter learning process of obtaining the learning value (tire diameter learning value $R_L$) of the tire diameter R is further executed. Further, in the step corresponding control (FIG. 3), the first switching determination time $\Delta T_{up}$ and the second switching determination time $\Delta T_{do}$ are set to be variable values according to the vehicle speed V determined based on the tire diameter learning value $R_L$ obtained by the tire diameter learning process.

Accordingly, in the step corresponding control, the first switching determination time $\Delta T_{up}$ that defines a start timing of a first control mode and the second switching determination time $\Delta T_{do}$ that defines a start timing of a second control mode can be determined in consideration of a change in the vehicle speed V caused by the change in the tire diameter R due to aging. Therefore, in the step corresponding control, a switching timing between the power running and the regeneration in the front wheels 11f and the rear wheels 11r can be determined with high accuracy, and an effect of reducing a vibration felt by an occupant can be more reliably exhibited.

Although the embodiments of the present invention have been described above, the above embodiments are merely a part of application examples of the present invention, and are not intend to limit the technical scope of the present invention to the specific configurations of the above embodiments.

The invention claimed is:

1. A driving force control method for controlling front wheel driving force and rear wheel driving force by a front wheel motor connected to a front wheel of a vehicle and a rear wheel motor connected to a rear wheel, respectively, the driving force control method comprising:

executing a step corresponding control of reducing a vibration transmitted to a vehicle cabin when the rear wheel rides up a step by adjusting driving force of the front wheel motor and driving force of the rear wheel motor when the vehicle passes through the step, wherein in the step corresponding control,
a control mode for adjusting driving force distribution is transitioned in an order of a first control mode in which the front wheel motor is regenerated and the rear wheel motor is powered and a second control mode in which the front wheel motor is powered and the rear wheel motor is regenerated, the first control mode is executed after a front wheel ride-up timing at which the front wheel rides up the step and before a rear wheel ride-up timing at which the rear wheel rides up the step, and the second control mode is executed after the execution of the first control mode and before the rear wheel ride-up timing; and executing a step determination process of determining whether the vehicle passes through the step, wherein, in the step determination process, when both of the front wheels are detected to have crossed the step, the vehicle is determined to pass through the step, and when at least one of the front wheels is not detected to have crossed the step, the vehicle is determined to not pass through the step, the driving force control method further comprises:

executing, when the vehicle is determined to pass through the step, the step corresponding control; and executing, when the vehicle is determined to not pass through the step, basic drive control to set the driving force of the front wheel motor and the driving force of the rear wheel motor to a prescribed basic driving force.

2. The driving force control method according to claim 1, further comprising:

starting the first control mode when a prescribed first switching determination time elapses from the front wheel ride-up timing.

3. The driving force control method according to claim 2, further comprising:

starting the second control mode when a second switching determination time longer than the prescribed first switching determination time elapses from the front wheel ride-up timing.

4. The driving force control method according to claim 3, further comprising:

executing a tire diameter learning process of obtaining a learning value of a tire diameter, wherein in the step corresponding control, the prescribed first switching determination time and the second switching determination time are set to be variable values according to a vehicle speed determined based on the learning value obtained in the tire diameter learning process.

5. A driving force control device that controls front wheel driving force and rear wheel driving force by a front wheel motor connected to a front wheel of a vehicle and a rear wheel motor connected to a rear wheel, respectively, the driving force control device comprising:

a step corresponding controller configured to execute step corresponding control to reduce a vibration transmitted to a vehicle cabin when the rear wheel rides up a step by adjusting driving force of the front wheel motor and driving force of the rear wheel motor when the vehicle passes through the step, wherein the step corresponding controller:
  transitions a control mode for adjusting driving force distribution in an order of a first control mode in which the front wheel motor is regenerated and the rear wheel motor is powered and a second control mode in which the front wheel motor is powered and the rear wheel motor is regenerated;
  executes the first control mode after a front wheel ride-up timing at which the front wheel rides up the step and before a rear wheel ride-up timing at which the rear wheel rides up the step; and
  executes the second control mode after the execution of the first control mode and before the rear wheel ride-up timing, and
the step corresponding controller further configured to:
  execute a step determination process of determining whether the vehicle passes through the step, wherein, in the step determination process,
  when both of the front wheels are detected to have crossed the step, the vehicle is determined to pass through the step, and
  when at least one of the front wheels is not detected to have crossed the step, the vehicle is determined to not pass through the step, the step corresponding controller is further programmed to:
    execute, when the vehicle is determined to pass through the step, the step corresponding control; and
    execute, when the vehicle is determined to not pass through the step, basic drive control to set the driving force of the front wheel motor and the driving force of the rear wheel motor to a prescribed basic driving force.

6. A driving force control method for controlling front wheel driving force and rear wheel driving force by a front wheel motor connected to a front wheel of a vehicle and a rear wheel motor connected to a rear wheel, respectively, the driving force control method comprising:
  executing a step corresponding control of reducing a vibration transmitted to a vehicle cabin when the rear wheel rides up a step by adjusting driving force of the front wheel motor and driving force of the rear wheel motor when the vehicle passes through the step, wherein the step corresponding control comprises:
  detecting a front wheel ride-up timing at which the front wheel rides up the step;
  measuring an elapsed time from the front wheel ride-up timing;
  performing a basic drive control for setting each of the front wheel driving force and the rear wheel driving force to a prescribed basic driving force, when the elapsed time is lower than a first switching determination time;
  performing a first control mode for regenerating the front wheel motor and powering the rear wheel motor, when the elapsed time is equal to or longer than the first switching determination time and lower than a second switching determination time; and
  performing a second control mode for powering the front wheel motor and regenerating the rear wheel motor, when the elapsed time is equal to or longer than the second switching determination time.

\* \* \* \* \*